Patented Mar. 15, 1938

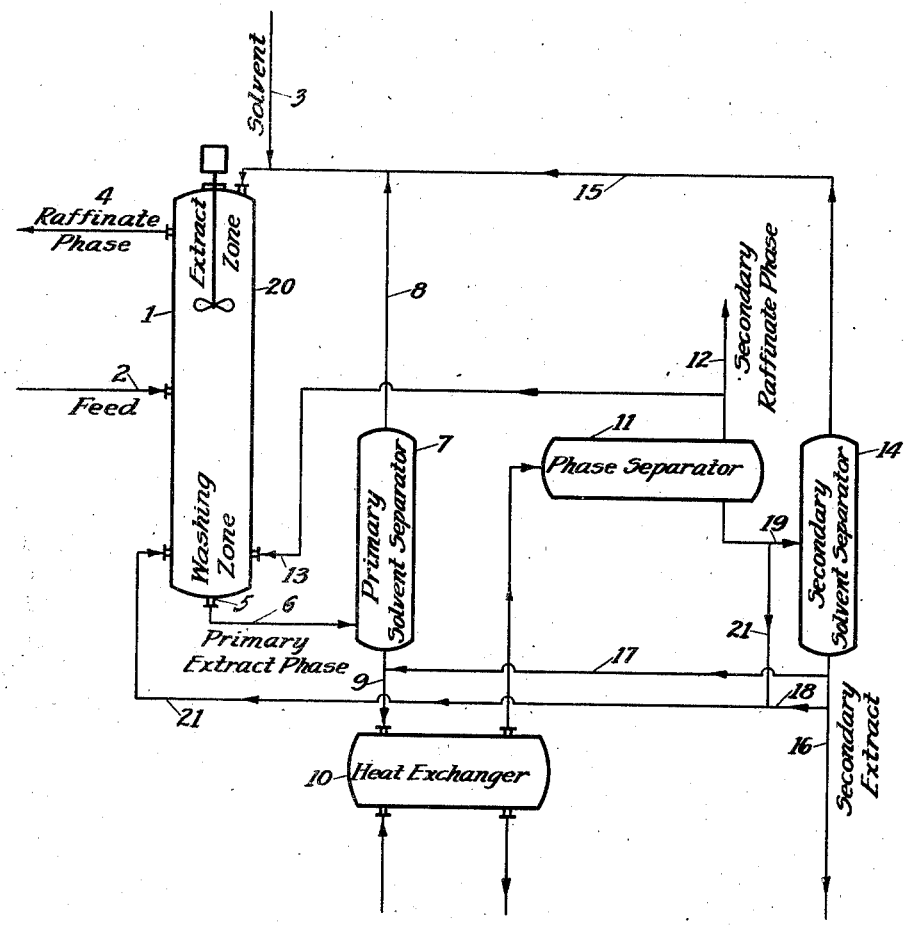

2,111,360

UNITED STATES PATENT OFFICE 2,111,360

EXTRACTION PROCESS

Frank C. Cutting, Normandy, Mo., assignor to Shell Development Company, San Francisco, Calif., a corporation of Delaware Application May 21, 1935, Serial No. 22,541

13 Claims. (Cl. 196—13)

This invention relates to extraction processes and constitutes an improvement thereof directed to increase the yield and improve the purity of substances or groups of substances which are obtained by extraction of liquid mixtures containing the same, and to permit the operation of such a process in an economical manner.

While the extraction processes for separating the components of liquid mixtures were known for a long time, the degree of separation as represented by the yield and/or purity of the obtained products is ordinarily considered to be limited by the dissolving capacity and selectivity of the solvent at the most favorable operating temperature. As an advancement in this art, the principle of countercurrent operation is now being widely applied.

More recently it has been proposed to extract liquid mixtures by means of two solvents flowing countercurrently to and in contact with each other, and through the mixture being extracted, whereby components soluble in the corresponding solvents are separated from the mixture. It has also been proposed to substitute one of such selective solvents by one of the components previously separated from the mixture, e. g., a portion of the extract itself.

It has also been proposed to operate the extraction process so that the extract and raffinate phases are separately removed from the extraction zone, or column, and the extract phase chilled. The chilled phase is thereby caused to separate into secondary extract and secondary raffinate phases outside of the extraction zone. The secondary raffinate phase is then returned to the extraction zone at a point near the entering feed of the liquid being extracted or at a point removed from it so as to pass countercurrently to the primary extract phase.

It is an object of my invention to provide a process which will separate the groups of substances contained in the mixtures being extracted more sharply and effectively than is possible with processes now known, with the same cost of operation and equipment, and which will effect the same degree of separation as the aforementioned prior process with a substantial saving in operating and/or installation costs.

In the solvent extraction of liquid mixtures to separate them into portions which are relatively more soluble and less soluble in selective solvent, a liquid mixture is mixed or extracted countercurrently with a selective solvent in the proportion and under conditions causing the formation of two liquid phases, which can be separated by settling or centrifuging because of the difference in their densities.

Consider, for example, a liquid mixture comprising components A and B which are, respectively, less soluble and more soluble in a selective solvent C. When this mixture is contacted with selective solvent C under proper conditions of temperature and concentration two conjugate phases of different compositions will be formed. Of these, the raffinate phase will contain A in a greater ratio to B than the original mixture, and may or may not contain an appreciable amount of C, depending upon the solubility and characteristics of the system. If now the original mixture is repeatedly extracted, as by a continuous countercurrent method, it becomes possible to obtain at one end of the extraction zone a raffinate phase approaching a composition which is quite free from B. By removing C from this ultimate phase, a raffinate consisting substantially of A may be obtained.

The component B will be preferentially dissolved in the extract phase, which is rich in C. This extract phase will, however, generally contain various amounts of A. To effect a high degree of separation between A and B by solvent extraction methods, it is necessary that the ratio of A to B in the extract phase be as low as possible. In situations in which B and C are completely miscible at the temperature employed, there exists a definite minimum for this ratio of A to B in the extract phase. When B and C are at least partially immiscible, this minimum is zero, i. e., it is then possible to produce an extract phase containing substantially no A. It is desirable to produce extract phases in which the ratio of A to B is as close as practical to these minima.

The value of this ratio which obtains in a particular situation depends upon the composition of the original feed, upon the quantity of solvent used, upon the temperature and upon the solvent characteristics of the components A, B and C at the temperature used, and will not, in general, correspond to these desired minima. I have found that in the extraction of an A+B mixture, with a preferential solvent for B, to produce substantially pure A, the quantity of solvent employed generally exceeds that which is necessary to produce an extract phase of the best composition, i. e., which will produce an extract phase having the lowest A to B ratio obtainable for the temperature employed.

The present invention provides a method of extraction for obtaining an improved extract, i. e., one which contains A and B in a lower ratio than is otherwise obtainable, without resorting to more selective solvents or to low temperatures. My invention consists in withdrawing from an extraction zone the extract phase produced by any desired extraction process, hereinafter referred to as the primary extract phase, and removing from said primary extract phase a portion of the solvent contained therein by any suitable means, as by absorption, precipitation, or distillation, bringing the resulting solvent-poor extract phase, by cooling, if desired, to a temperature at which it will separate into secondary extract and secondary raffinate phases, and separating these phases; the remainder of the solvent may then be removed from either or both secondary phases. This treatment of the primary and subsequent extract phases may be repeated, if desired, although by proper temperature regulation a highly concentrated extract may be produced in a single step. Only so much solvent is preferably removed as to produce an extract phase having the minimum A to B ratio attainable with the particular solvent at the temperature selected for the separation into secondary raffinate and extract phases.

My process is not limited to any particular temperature for this second separation, although it is preferable to maintain this temperature at the same value as that prevailing at the point of the extraction zone at which the primary extract phase is formed, or below this value. It is, however, also possible to use higher temperatures.

The secondary raffinate may be withdrawn as a separate product. It is, however, often advantageous to return it to the extraction zone to contact or wash the primary extract phase. This washing may be effected in any manner, although I prefer to flow the secondary raffinate countercurrently to the extract phase; it causes a considerable amount of the less soluble components to be dissolved in the secondary raffinate phase, thereby improving the composition of the primary extract phase. In operations in which the secondary raffinate phase is used in this manner it may be desirable to determine the quantity of solvent removed by the consideration that the secondary raffinate phase is produced in the desired quantity to permit effective washing of the primary extract phase in the main extraction or washing zone.

In order to more fully describe my process, reference is had to the flow diagram illustrating a preferred embodiment of my invention.

According to a continuous method of operation, as illustrated by the drawing, a liquid mixture to be extracted is led into an extraction apparatus 1 through an inlet 2. This apparatus may consist of a packed tower, or a number of countercurrent washing stages, or of any other type of apparatus which is suitable for countercurrent washing of one liquid phase with another. A suitable solvent, or a solvent mixture, is introduced into the apparatus 1 by a pipe 3. Primary raffinate and extract phases are removed respectively through outlets 4 and 5. In practice, the length of the extraction zone, or the number of mixing and settling stages, that is, the zone, or zones, where the feed is extracted with the solvent, is so selected as to insure the desired composition of the final raffinate phase. The extract phase outlet 5 may be substantially away from the feed inlet 2, as shown, so as to provide a zone for washing the extract phase formed near the feed inlet 2. It is often advantageous to provide the extraction apparatus with temperature regulating means whereby the washing zone or the entire extraction apparatus may be operated at a temperature gradient. For example, I have obtained excellent results by maintaining a temperature 100° C. at the top of the column and 20° C. at the bottom, when extracting a number of hydrocarbon oils with various solvents.

Moreover, it is often desirable to introduce a current of gas into the column to prevent channelling and break up accumulations of drops of one phase. Sometimes this washing zone may be omitted, and it is to be understood that my invention is not limited to any particular method of producing the primary extract phase, but may be used to improve any extract phase.

The primary extract phase is introduced by a conduit 6 into the primary solvent separator 7, where it is freed of a portion of the solvent. The solvent separator 7 may be of any desired type, such as a distilling column.

The liberated solvent is removed through a conduit 8 and may be reused. The solvent-poor extract is withdrawn from the separator 7 through a pipe 9 and conducted through a heat exchanger 10 into separating apparatus 11, which may be either a settling tank or a centrifugal separator, or any other apparatus which is capable of separating two liquid phases. The heat exchanger 10 is operated at a temperature which will cause the liquid in the apparatus 11 to have the desired temperature for the separation of secondary raffinate and extract phases. This temperature may be slightly higher than that which obtains in the apparatus 1, although it should preferably be the same as or lower than that which obtains at the outlet 5.

In the apparatus 11 the extract and raffinate layers are allowed to separate, the latter being discharged through a pipe 12. This raffinate may be used as a source of a second grade refined product, or subjected to an additional extraction with a solvent, or it may be returned to the extraction apparatus 1, for example, through an inlet 13 near the outlet 5.

When the secondary raffinate phase is returned to the apparatus 1 it may be used as a backwash for the downcoming extract phases. For effective washing, this backwash must be of such composition and in such quantity as to form, upon combining with the primary extract phase, two liquid phases. It may be desirable to flow the secondary raffinate phase through a heating or cooling device, so as to cause its temperature to be suitably adjusted, for example, to be substantially the same as that which obtains in the column at its point of introduction.

The secondary extract phase from the settling chamber 11 is led by the conduit 19 into the final solvent separator 14, where it is substantially freed of the solvent. The solvent separator 14 may be of any desired type, such as a distilling column. The liberated solvent is returned to the apparatus 1 through a pipe 15, and the solvent-free secondary extract is discharged through a pipe 16. A portion of this extract may be recycled through a pipe 17 and mixed with the solvent-poor extract phase before it enters the separator 11, either before or after the heat exchanger 10, or it may be returned by conduits 18 and 21 to the washing zone of the apparatus 1 instead of the secondary raffinate phase introduced in 13.

Numerous modifications may be made in my process without departing from the spirit and scope of the invention. For example, the process may be applied to batch operations. In this event the proper amount of oil is initially fed into the extraction apparatus 1 and solvent is introduced at the top or at any intermediate point of the column. If desired, a mixing device 20 may be provided. It is, moreover, often desirable to blow an inert gas through the apparatus to maintain the proper degree of dispersion and aid in the attainment of composition equilibrium. A negative temperature gradient in the direction of flow of the solvent may be provided so that a uniform solubility of oil in the solvent in all parts of the apparatus is maintained. The extract phase thus produced is continuously withdrawn at 5 and treated in the manner described above. The apparatus is preferably at first operated in such a manner that no extract is withdrawn, as by shutting a valve in the conduit 19 and returning secondary extract phase to the apparatus 1 through 21 until substantial equilibrium has been established. If desired, I may dispense with conduit 21 and conduct both the secondary extract and the secondary raffinate phase through the conduit 13. During this preliminary operation the volumes of solvent and backwash introduced into the apparatus 1 are equal to the volume of the extract phase withdrawn at 5. This operation corresponds to operation of a fractionating column at total reflux. When a secondary extract phase of the desired composition collects in the separator 11, the valve in conduit 19 is opened and the withdrawal of the extract phase and the recovery of extract therefrom begun. It will generally be necessary to raise the temperature at the column 1 as the extraction proceeds in order to dissolve oil fractions which progressively become less soluble as the extraction is carried on.

In actual practice it may not be possible or practical to control the operation of the primary solvent separator 7 and/or of the admixture of final raffinate so as to produce a composition which will form an extract phase containing A and B in the lowest ratio theoretically possible for the temperature selected. The degree of separation achieved also depends on the length of the washing zone in the apparatus 1. It is to be understood that improved results are nevertheless obtained, and that my process is not limited to operations in which the theoretically optimum separation characteristics are produced.

In many actual applications of my process the feed mixture may consist of two or more groups of substances, the substances of each group having similar solvent group characteristics, but being, nevertheless, separate and distinct. In these situations A and/or B may consist of a plurality of substances, but, for the purposes of my invention, each may be regarded as one component. Similarly, a selective solvent mixture may often be used in place of a single solvent. Nevertheless, all such complex systems respond to my extraction treatment, so that a sharp separation of the components can be obtained by the method of this invention.

For example, essential oils such as citronella oil may be separated by this process into its constituents, such as alcohols, geranoil or aldehydes (citronellal). The method may, similarly, be applied to the extraction of fatty acids, such as acetic acid, from their aqueous solutions by means of ether and/or other solvents.

Various mineral oils such as tars, lubricating oils, transformer oils, spindle oils, vaseline, gas oils, refined oils, kerosenes, naphthas, gasolines, etc. may be extracted with organic solvents whose molecules contain one of the following groups: $-NO_2$, $-CN$, $-OH$, $=CO$, $-CHO$, $-COOH$, $-COOR$ (where R stands for an alkyl radical), $-ONO$, $-SH$, $=CS$, $-CONH_2$, $-SCN$, $=CHOH$, $=COH$, $-CH_2OH$, $=C-Cl$, $NH_2$, etc. Examples of these are mono- or polyvalent alcohols, e. g., isopropyl alcohol, furfural, furfuryl alcohol, aniline, nitromethane, nitro-benzene, nitro-naphthalene (alpha and beta), nitro-aniline, chlorex, phenols, nitriles and thiocyanates, such as acetonitrole, naphthonitrile (alpha and beta), methyl thiocyanate ketones, aldehydes, esters, such as glycolformiate and amylacetates, heterocyclic compounds containing sulphur and/or nitrogen atoms in their ring or rings, such as thiophene, pyridine, quinoline, or their derivatives; also mixtures of these solvents with each other or with auxiliary solvents may be used. These auxiliary solvents may, for example, be aromatic compounds as benzol and alkyl benzene, polycyclic aromatics, alcohols, naphthas, etc.

The present process may also be applied to the extraction of liquid mixtures containing one or more organic polar compounds. In the separation of such mixtures there are two cases in which the process of this invention is especially suitable.

The mixture to be separated may consist of organic substances which differ in the number of polar groups they contain. Examples of such substances are: mono-nitrobenzene and di-nitrobenzene, or an organic substance with one $-OH$ group and a similar substance with two $-OH$ groups. The mixture may also consist of organic substances which differ in the intensity of the polar groups. Thus, a mixture of furfural and furfuryl alcohol constitutes an example of this group.

For the separation of such a mixture use can be made of a polarizable solvent which has no dipole-moment, or of a solvent which is slightly polar and in addition polarizable. Examples of such kinds of solvents are: a high molecular benzene hydrocarbon, i. e., a benzene hydrocarbon containing aliphatic groups, naphthenes, such as cyclohexane, or its homologues or analogues, the higher olefines (e. g., those present in cracked paraffin wax). Sometimes the cracked wax itself may be used.

Additional examples are given below:

A mixture of a higher alcohol and a phenol may be extracted using water as the selective solvent, the phenol being preferentially dissolved in the water.

Glycol chlorhydrin and glycol may be treated using diethyl ether as a solvent.

Acetic acid and water may be extracted with amyl acetate.

Although I have given a few specific examples, it is understood that my invention is not limited thereto, but may be applied to any process in which a liquid mixture is extracted with a solvent which, when added to the said mixture, is capable of causing the formation of two liquid phases containing the components of said mixture in a different ratio than the original mixture.

By the term "components", as used hereinafter in the claims, is designated either of the two portions of any liquid mixture which portion can either be separated from or concentrated into each other by extraction with a solvent or a solvent mixture. It will be evident that by the word "component" is meant not only one chemically pure substance, but that this term covers also a mixture of substances. A component is said to be pure if it does not contain any portion of a substance which should be present only in the other component. In the present specification and claims, there is no difference in meaning between the words "solution", "liquid mixture" and "liquid solution."

I claim as my invention:

1. The process of separating a liquid mixture of components into two portions which comprises extracting said mixture with a liquid selective solvent to produce primary raffinate and extract phases, separating said primary phases, removing a portion of the solvent from the primary extract phase to produce a solvent-poor extract phase and cause its separation into two secondary phases, separating said secondary phases, removing the solvent from the secondary extract phase to produce a final extract and mixing at least a portion of said final extract with another quantity of solvent-poor extract phase prior to its separation into secondary raffinate and extract phases.

2. The process of separating a liquid mixture of components into two components which comprises extracting said mixture with a liquid selective solvent in an extraction zone to produce primary raffinate and extract phases, separating said primary phases, removing a portion of the solvent from the primary extract phase to produce a solvent-poor extract phase, adjusting the temperature of said solvent-poor extract phase, to produce secondary raffinate and extract phases, separating the said secondary phases, removing the remaining solvent from the secondary extract phase to produce a final extract and returning a portion of the final extract to the solvent-poor extract phase prior to its separation into secondary raffinate and extract phases, the amount of solvent present in the solvent-poor extract phase and the amount of final extract mixed with it being such that the composition of the secondary extract is substantially the most favorable which can be obtained at the adjusted temperature.

3. The process according to claim 2 in which the adjusted temperature is the same as that at which the primary extract phase is produced.

4. The process according to claim 2 in which the adjusted temperature is substantially below that at which the primary extract phase is produced.

5. The process according to claim 2 in which the secondary raffinate phase is returned to the extraction zone.

6. The process of separating a liquid mixture into two components which comprises extracting said mixture with a liquid selective solvent to produce primary raffinate and extract phases, separating the primary phases, removing a portion of the solvent from the primary extract phase to produce a solvent-poor extract phase and cause its separation into two secondary phases, separating said secondary phases, and bringing a portion of the secondary raffinate phase into contact with the primary extract phase.

7. The process of separating a liquid mixture into two components which comprises extracting said mixture with a liquid selective solvent to produce primary raffinate and extract phases, separating the primary phases, removing a portion of the solvent from the primary extract phase to produce a solvent-poor extract phase and cause its separation into two secondary phases, separating said secondary phases, and flowing a portion of the secondary raffinate phase countercurrently to and in contact with the primary extract phase.

8. The process of separating a liquid mixture of components into two portions which comprises extracting said mixture with a liquid selective solvent to produce primary raffinate and extract phases, separating the primary phases, removing a portion of the solvent from the primary extract phase to produce a solvent-poor extract phase and cause its separation into two secondary phases, separating said secondary phases, removing the solvent from the secondary extract phase to produce the final extract, returning a portion of the final extract to the solvent-poor phase, and bringing a portion of the secondary raffinate phase into contact with the primary extract phase.

9. The process of separating a liquid mixture into two components which comprises extracting said mixture with a liquid selective solvent to produce primary raffinate and extract phases, separating said primary phases, removing a portion of the solvent from the primary extract phase to produce a solvent-poor extract phase, adjusting the temperature of said solvent-poor extract phase to produce secondary raffinate and extract phases, separating said secondary phases, and bringing at least a portion of the secondary raffinate phase into contact with the primary extract phase.

10. The process of separating a liquid mixture into two components which comprises extracting said mixture with a liquid selective solvent to produce primary raffinate and extract phases, separating said primary phases, removing a portion of the solvent from the primary extract phase to produce a solvent-poor extract phase, adjusting the temperature of said solvent-poor extract phase to produce secondary raffinate and extract phases, the amount of solvent removed being such that the secondary extract phase produced has substantially the most favorable composition obtainable at the adjusted temperature, separating said secondary phases, and bringing at least a portion of the secondary raffinate phase into contact with the primary extract phase.

11. The process of separating a liquid mixture into two components which comprises extracting said mixture with a liquid selective solvent to produce primary raffinate and extract phases, separating said primary phases, removing a portion of the solvent from the primary extract phase to produce a solvent-poor extract phase, adjusting the temperature of said solvent-poor extract phase to produce secondary raffinate and extract phases, separating said secondary phases, and bringing at least a portion of the secondary raffinate phase into countercurrent contact with the primary extract phase in a plurality of countercurrent washing stages.

12. The process of separating a liquid mixture into two components which comprises extracting said mixture with a liquid selective solvent to produce primary raffinate and extract phases, separating said primary raffinate and extract phases, removing solvent from the primary extract phase in such amounts as to yield, upon cooling the resulting solvent-poor extract phase to its original temperature, a secondary raffinate phase in suitable quantity for countercurrently washing the primary extract phase, separating the resulting solvent-poor extract phase into secondary extract and raffinate phase at its original temperature, and bringing at least a portion of the secondary raffinate phase into countercurrent contact with the primary extract phase.

13. The process of separating a liquid mixture into two components which comprises extracting said mixture with a liquid selective solvent to produce primary raffinate and extract phases, separating said primary phases, removing a portion of the solvent from the primary extract phase to produce a solvent-poor extract phase, adjusting the temperature of said solvent-poor extract phase to produce secondary raffinate and extract phases, separating the said secondary phases, removing the solvent from the secondary extract phase to produce a final extract, and mixing final extract with another quantity of solvent-poor extract phase prior to its separation into secondary raffinate and extract phases.

FRANK C. CUTTING.